United States Patent [19]

Testin

[11] Patent Number: 5,036,261
[45] Date of Patent: Jul. 30, 1991

[54] STANDBY/RUN POWER SUPPLY AND CONTROL CIRCUIT

[75] Inventor: William J. Testin, Indianapolis, Ind.

[73] Assignee: Thomson Consumer Electronics, Inc., Indianapolis, Ind.

[21] Appl. No.: 392,311

[22] Filed: Aug. 11, 1989

[51] Int. Cl.$^5$ .................... H01J 29/70; H04N 5/63
[52] U.S. Cl. ..................................... 315/411; 358/190
[58] Field of Search ....................... 315/411; 358/190

[56] References Cited

U.S. PATENT DOCUMENTS 4,680,511 7/1987 Fitzgerald et al. ............... 315/411
4,737,851 4/1988 Shanley, II et al. ............ 358/1990

OTHER PUBLICATIONS

RCA/GE Color Television Service Data CTC 148/149, Thomson Consumer Electronics, Inc. pp. 2-3, Apr. 1989, Deflection and Power Supply Schematic (Cold Chassis).

Primary Examiner—Gregory C. Issing
Attorney, Agent, or Firm—Joseph S. Tripoli; Joseph L. Laks; Harvey D. Fried

[57] ABSTRACT

A standby/run power supply and control circuit for a television apparatus comprises first and second sources of DC voltage, one of which is unswitched and available during a standby mode of operation and the other one of which is switched and available only during a run mode operation. A voltage regulator has an input coupled to both DC sources and has an output for supplying a regulated DC voltage at a first powr level during the standy mode and at a second power level during the run mode. A first control circuit, such as a CMOS integrated circuit, is coupled to the regulated voltage output and operable in both the standby and run modes. A second control circuit, such as a second CMOS integrated circuit, is interconnected with the first control circuit, for example by a common control bus. The second control circuit is also coupled to the regulated voltage output, but is operable only during the run mode. The first control circuit is energized by the first source in the standby mode and both the first and second control circuits are energized by the second source at a common voltage level in the run mode. Interconnected CMOS integrated circuits, some active in standby and run, and some active in run only, operate without risk of SCR latching. Reliance on standby power during the run mode is minimized. The time during which power is available to a micropocessor for effecting controlled shutdown during AC power interruption is maximized.

29 Claims, 6 Drawing Sheets

STANDBY/RUN POWER SUPPLY AND CONTROL CIRCUIT

The invention relates generally to the field of power supplies for television apparatus, and in particular, to power supplies for control circuits in television apparatus adapted for operation in both standby and run modes of operation.

Televisions, video recorders and the like, hereinafter referred to generally as television apparatus, are often provided with features requiring that some circuits of the television apparatus be energized at all times, even when the consumer considers the television apparatus to be turned off. These features include, for example, instant-on, clocks and timers, remote control with power on/off capability and sophisticated control functions. Sophisticated control functions may include, for example, automatic programming to identify tunable channels, whether broadcast or cable, for step-wise selection and similar functions. These features are often under the control of one or more integrated circuits, at least one of which is usually embodied as a microprocessor.

Television apparatus with such features as described above, and others, are provided with standby power supplies. A standby power supply is generally an unswitched power supply which becomes operable whenever the apparatus is coupled to a source of AC power, for example, whenever the apparatus is plugged into an AC mains supply energized socket.

Standby power supplies are of generally similar construction. A transformer has a primary winding coupled to the power plug of the apparatus and has a secondary winding coupled to the input terminals of a rectifier circuit, for example a full wave bridge rectifier. The output terminals of the full wave bridge rectifier generate an unregulated DC voltage at a level which is related to the voltage level of the AC power source and the turns ratio of the transformer. The output of the full wave bridge rectifier charges a large filter capacitor. A voltage regulator coupled to the filter capacitor and to the bridge rectifier provides a regulated DC voltage for operating standby loads, for example integrated circuits embodying microprocessors, random access memories and remote control receiver. It has been the practice in some television apparatus to utilize the same standby power supply for energizing these same standby loads during run mode operation as well. In accordance with this practice, loads which are operable only during the run mode of operation are powered by one or more separate power supplies, for example those derived by operation of a switched mode power supply, for example the horizontal deflection circuit in a television, which includes a flyback transformer.

The use of separate unregulated DC voltage sources for standby mode loads and run mode loads presents two significant problems, one of economics and one of performance and reliability. The problem of economics relates to the cost of supplying standby power from unswitched sources as compared to the cost of supplying run mode power from switched sources. Standby power is usually much more expensive than run power, for a number of reasons. Firstly, the components required to construct a standby power supply tend to be more expensive, especially the transformer. Secondly, run mode power can often be supplied by existing secondary supplies operating in a switch mode and/or flyback converter mode of operation. Moreover, transformers used in switch mode power supply circuits and horizontal deflection circuits are usually less expensive for a given capacity than the standard 60 Hz transformer (for 60 Hz mains supplies) needed for a standby power supply. The relative cost will vary according to the particular circuit parameters and load requirements, but the difference in cost can be as much as a factor of twenty times. Even if the unit savings for utilizing run mode power rather than standby mode power is small, the large numbers of apparatus in which such circuits are included can result in large overall savings.

Performance and reliability are also important. Microprocessor control of television apparatus has become more comprehensive and more operational functions are digitally controlled. As large scale integration of discrete component circuits becomes more common, it is necessary to establish common communication paths between each of the integrated circuits. It is also necessary to utilize integrated circuits which exhibit fast switching characteristics and prove reliable over the long term. Integrated circuits manufactured in accordance with CMOS technology have become popular for this purpose.

Microprocessor control may require that some of such CMOS integrated circuits be interconnected, for example, by a communications and control bus such as a three wire serial communications bus. In earlier generations of microprocessor controlled television apparatus, all of the control integrated circuits present were needed to operate with the apparatus turned off, but in the standby mode of operation. Under these circumstances, there was no particular need to have different power supplies for the different integrated circuits. In subsequent generations of microprocessor controlled television apparatus, additional integrated circuits were implemented, which circuits did not have to receive power in the standby mode of operation, but only in the run mode of operation, that is, when the television apparatus has been switched on. It is possible, of course, to utilize a standby voltage source with sufficient capacity to power both kinds of integrated circuits, that is, those operable in both standby and run modes of operation and those operable only in the run mode of operation. However, this places an additional burden on the standby power supply, which in turn places an additional burden on the standby transformer. The cost of providing standby power for all of the integrated circuits, for both standby and run modes of operation, can be prohibitive.

Efficient operation suggests the need for separate power supplies for those integrated circuits requiring power only in the run mode of operation. However, CMOS integrated circuits which are interconnected with one another are subject to a problem commonly referred to as SCR latching. When this condition occurs, switching gates within the integrated circuit lock up and control function is lost. The problem results from exceeding a certain tolerance for differences between the $V_{DD}$ supply for the IC and the maximum voltages applied to different input pins of the integrated circuit. It will be appreciated that integrated circuits which are interconnected with one another, for example by a communications bus, share a common reference potential. Most CMOS integrated circuits in production specify a maximum of $V_{DD}+0.3$ v on any input pin to guarantee that the integrated circuit will not exhibit any unspecified behavior. At greater than $V_{DD}+0.3$ v, unguarded flipflops, RAM cells and other integrated functions may change state as well, in addition to the possibility of an SCR latch. Consider, for example, two CMOS integrated circuits. One CMOS integrated circuit is powered by a 5 volt standby supply and the other is powered by a 5 volt run supply. If both power supplies operate at 5.0 v ±5%, the worst case difference between the outputs of the voltage supplies is 1.05 (5 v)−0.95 (5 v)=0.5 v. Since both integrated circuits are interconnected, for example by a serial bus, with the output of one integrated circuit driving the input of the other, the difference between voltage supplies violates the $V_{DD}+0.3$ v rule.

In conventional television apparatus, Zener diodes of 5% tolerance are often utilized in voltage regulating circuits. However, once ΔVz and temperature drift tolerances are taken into account, the nominal supply can exhibit a 10% variation in voltage level. For the example under consideration, the input of one of the CMOS integrated circuits could exceed $V_{DD}$ by 1 volt. An SCR latch under these conditions is very likely.

In general, a 0.6 v−0.7 v difference is needed to generate an SCR latch. In addition to applying a voltage greater than $V_{DD}$ to an input or output pin, sufficient current must be supplied to the input or output pin to force the SCR latch condition. Due to variations in CMOS processes and due to the differences in input circuits and output circuits, the required latch current can vary from several milliamps to nearly an amp. However, the current going into the pin is returned to either B+ or ground. The concern for a combined run/standby supply is for SCR latches caused by overvoltages to a pin which returns through the B+ pin. If the impedance of the B+ supply can be increased under potential SCR latch conditions, the current into an input or output pin may be kept from being sufficient to cause an SCR latch. In some cases, some of the control circuits may be switched off while other are left on. This same condition exists if the supply voltage for one integrated circuit is maintained by the charge in a capacitor and the supply voltage for another integrated circuit connected to the first integrated circuit is not maintained by the charge in the capacitor. If the power supply for the integrated circuit not being maintained is a low impedance, an SCR latch condition can occur. Power supplies used in accordance with this invention advantageously use NPN transistors in series pass regulators in addition to NPN transistors used in switches for the loads. The base-emitter junction of each of these transistors is reverse biased when a voltage is applied to an input or output pin while the power supply is turned off. This configuration precludes a return path for the potential current flow, and so avoids an SCR latch.

One solution which has been implemented for solving the latching problem addresses reliability, but not efficiency and cost. Adjustable voltage attenuators are interposed in the respective supply lines of the standby and run sources to enable manual equalization of the voltage levels. Such a solution is unsatisfactory for the long term.

It is an aspect of the invention to provide a common voltage supply for all interconnected integrated circuits, particularly CMOS integrated circuits, in a television apparatus. In accordance with this aspect of the invention, a standby/run power supply and control circuit for a television apparatus comprises first and second sources of DC voltage, one of which is available during a standby mode of operation and the other one of which is available only during a run mode of operation. A voltage regulator has an input coupled to both of the DC voltage sources and has an output for supplying a regulated DC voltage during both the standby and run modes of operation. A first load circuit, for example, a CMOS integrated circuit operable during standby and run modes of operation, is coupled to the regulated voltage output. A second load circuit, for example a second CMOS integrated circuit interconnected with the first CMOS integrated circuit, is also coupled to the regulated voltage output. The second load circuit may be a switched load, which is turned on during the run mode of operation by the integrated circuit comprising the first load circuit, for example a microprocessor.

It is a further aspect of the invention to limit the necessary capacity of a standby power supply to reduce cost and enhance efficiency. In accordance with this aspect of the invention, the second source of unregulated DC voltage, which is available only during the run mode of operation, is a switched supply for generating the run source of DC voltage from a secondary side supply derived from operation of a switch mode power supply circuit. The switch mode power supply circuit may comprise, for example, a 20 kHz transformer in a primary vipur power supply or a 15 kHz flyback transformer in a horizontal deflection circuit.

In accordance with another aspect of the invention, those loads operable during standby and run modes of operation are powered by the standby power supply during the standby mode but, together with run mode only loads, are powered by the run power supply during the run mode. No loads are powered by the standby voltage source during the run mode. The voltage regulator therefore supplies regulated DC voltage at a first power level during the standby mode and at a second power level during the run mode.

It is yet another aspect of the invention to provide an emergency source of DC voltage during conditions of unintended power interruption. In accordance with this aspect of the invention, each of the standby and run power supplies is provided with a large energy storage device, for example a large capacitor. The energy storage device of the standby source will remain fully charged during the run mode of operation, because the apparatus will be powered completely by the run source of voltage at a higher level. Under power failure conditions, for example, the run voltage source will quickly become inoperable. However, power will still be available, first from the energy storage device in the run source, and thereafter from the energy storage device in the standby power source, for a sufficient amount of time to enable the microprocessor to effect an orderly shutdown of the television apparatus. An orderly shutdown of the television apparatus increases the chance that normal operation can be restored when AC power is restored, for example, without requiring a complete automatic reprogramming of the television apparatus. It will be appreciated that, if the interconnected CMOS integrated circuits were powered by separate power supplies, an orderly shutdown would be impeded by SCR latching due to the differences in time before the run supply and the standby supply become inoperative, even if their respective voltage supply levels are the same.

Figure 2:
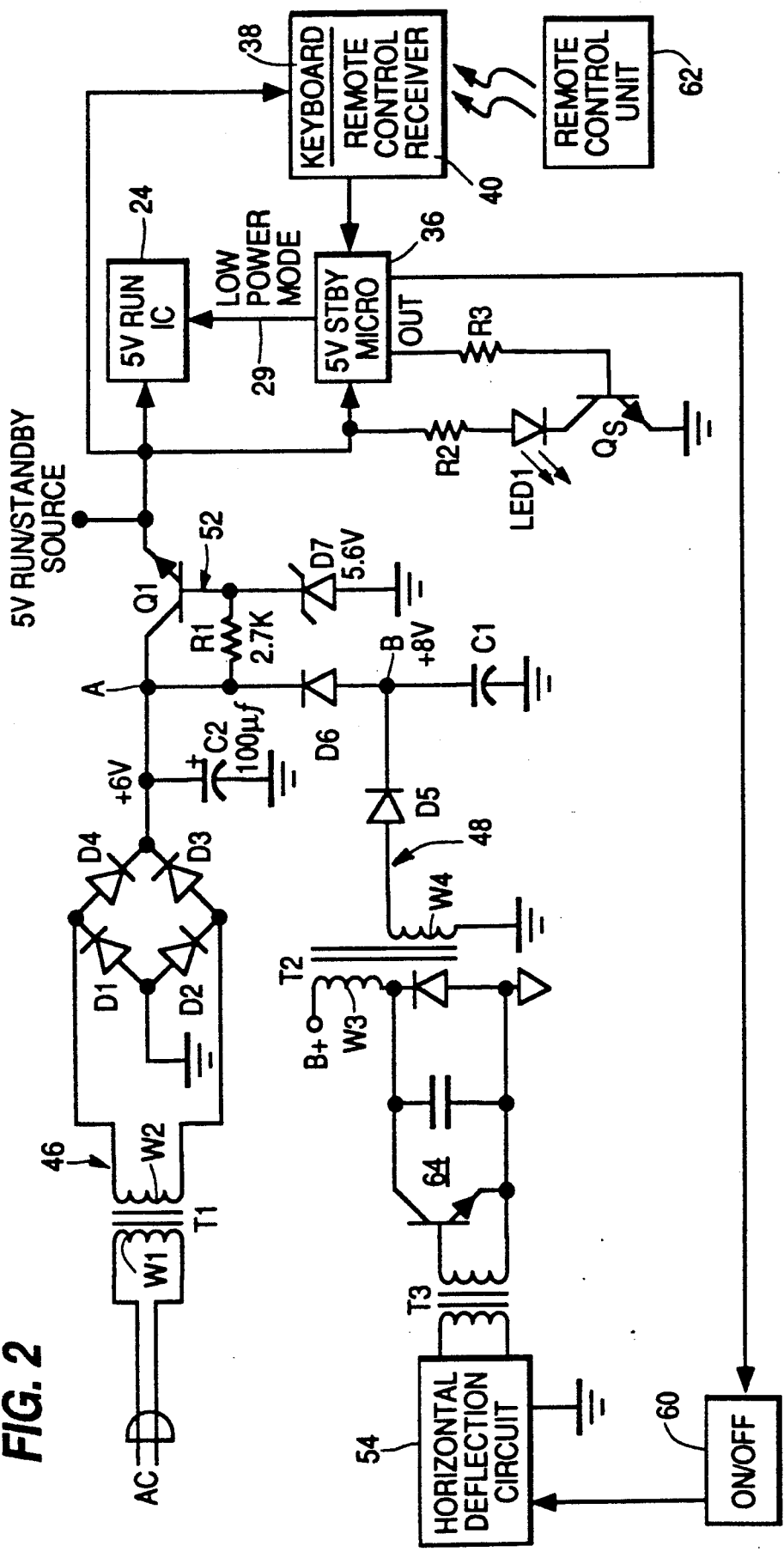
FIG. 2 is a circuit schematic, partially in block diagram form, of a first standby/run power supply and control circuit according to the invention.

FIGS. 3(a)-3(e) are a composite timing diagram illustrating operation of the circuit shown in FIG. 2.

Figure 4:
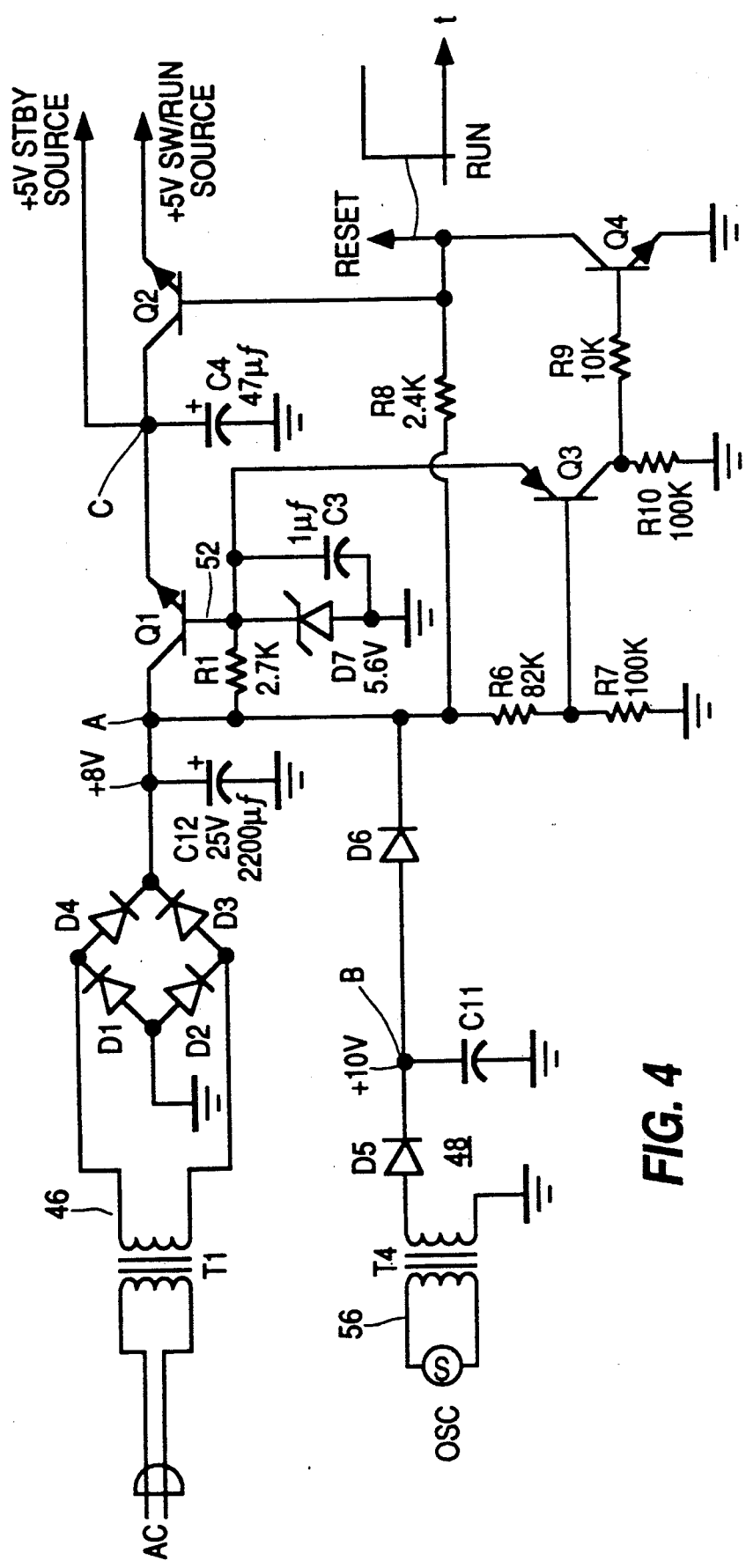

FIG. 4 is a circuit schematic of an alternative embodiment of a standby/run power supply for a control circuit, and including a circuit for switching the run voltage.

Figure 5:
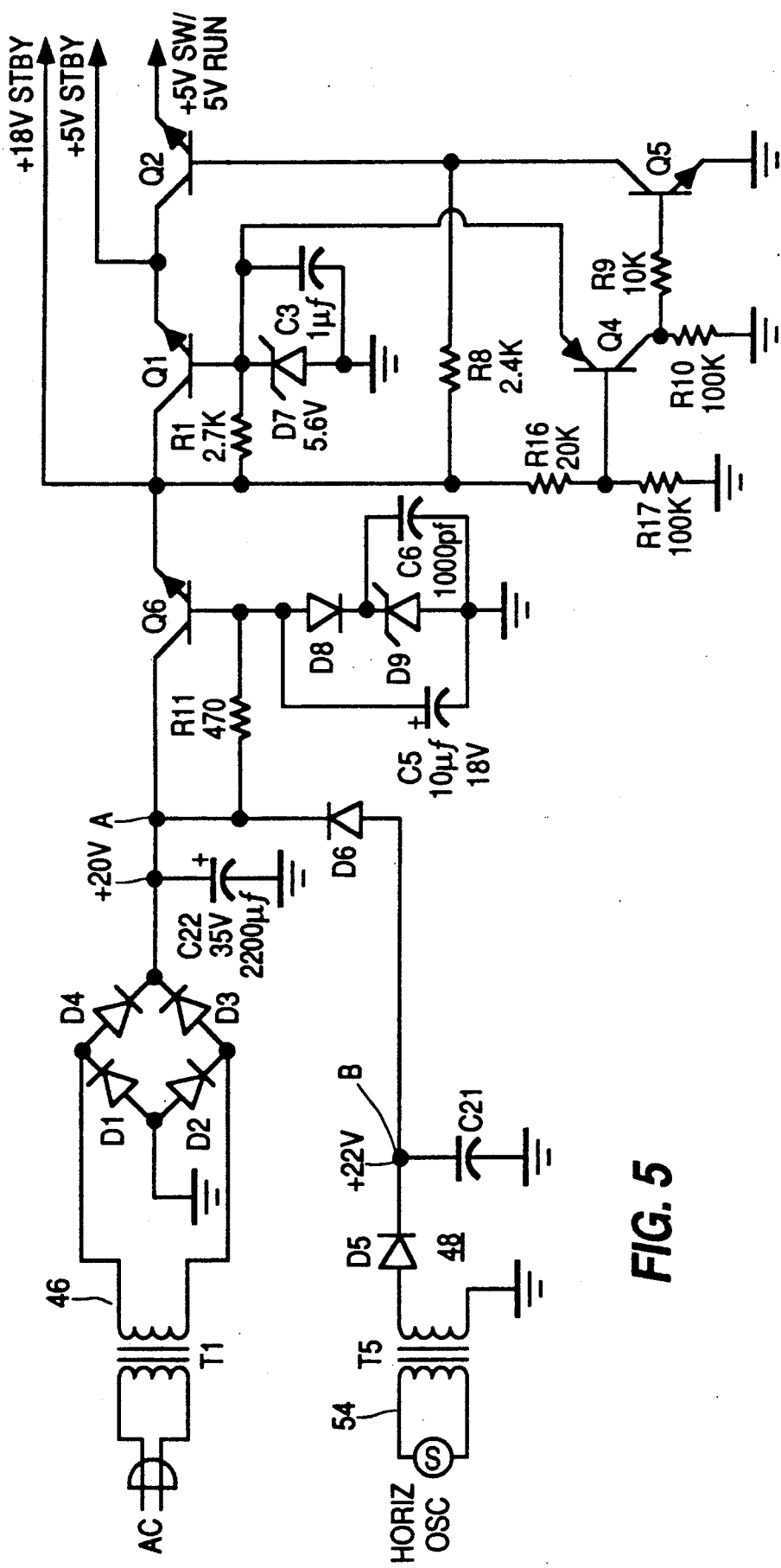

FIG. 5 is a circuit schematic of another alternative embodiment of a standby/run power supply for a control circuit including two regulated standby voltage supplies and a switched run voltage supply.

Figure 6:
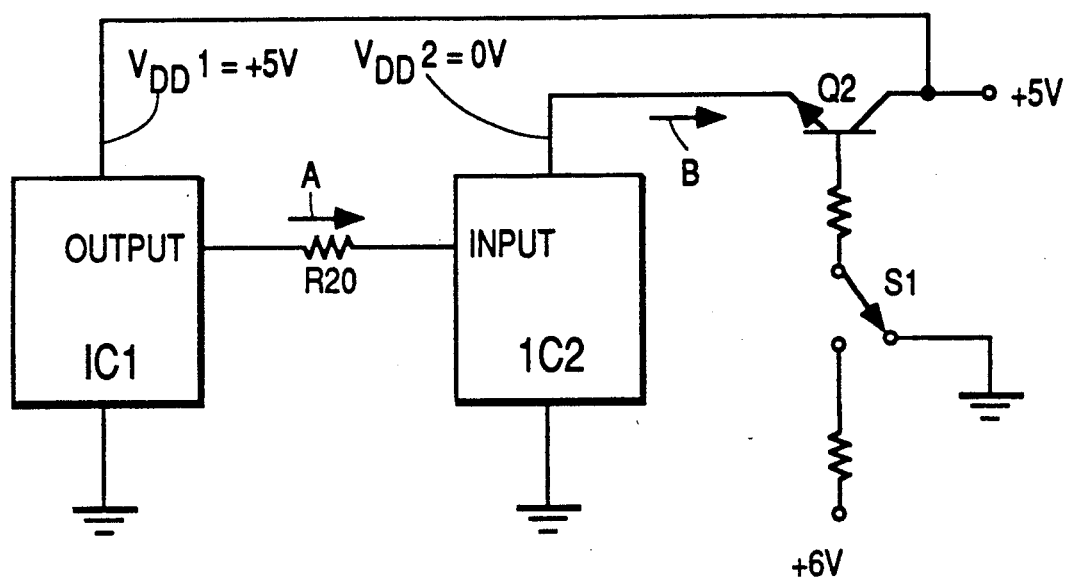

FIG. 6 is a circuit schematic illustrating the use of NPN transistor switches for controlling switched control circuits.

Figure 1:
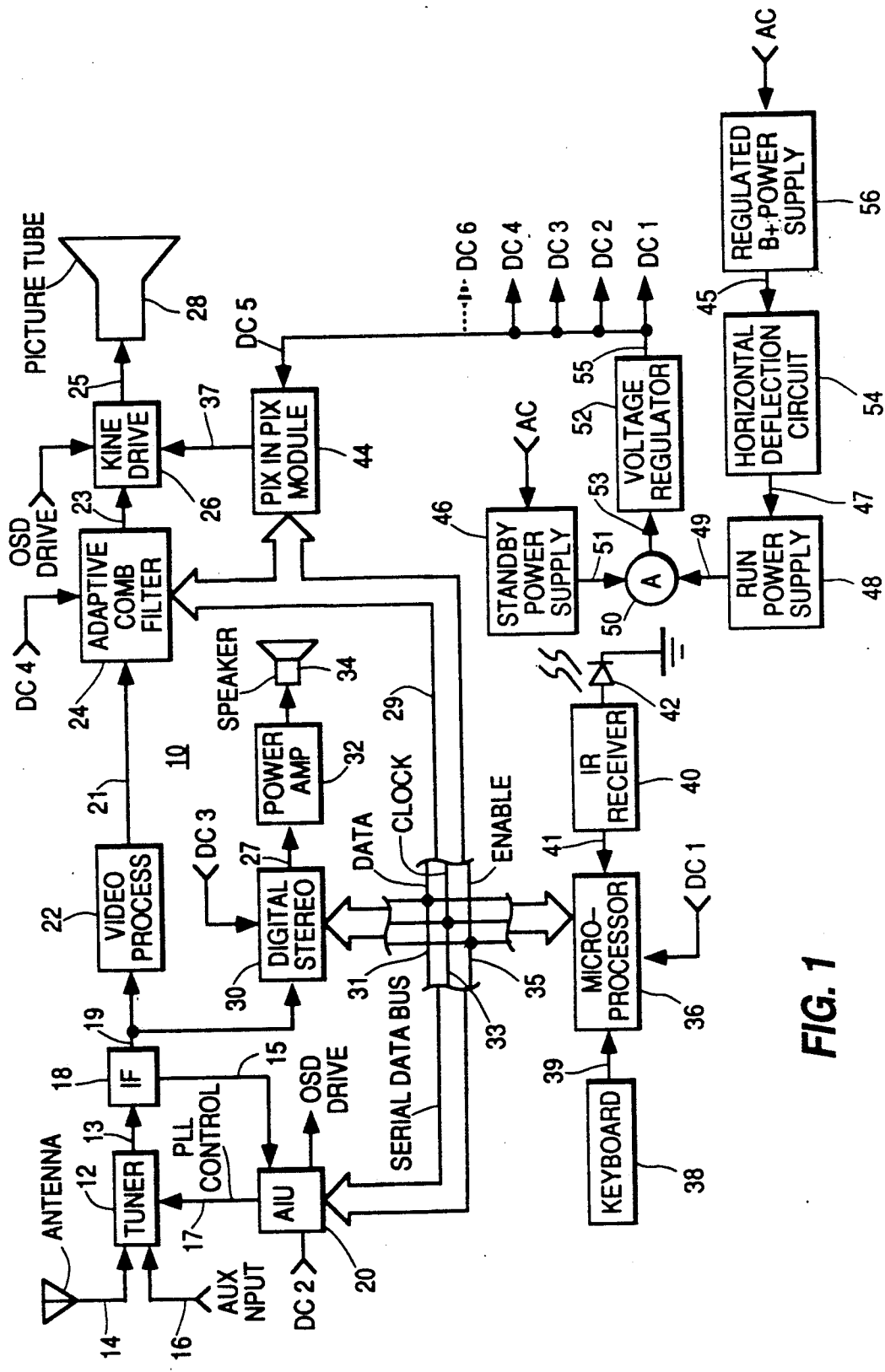
FIG. 1 is a block diagram of a television apparatus incorporating a standby/run power supply and control circuit according to this invention.

A television is shown in block diagram form in FIG. 1, and generally designated by reference numeral 10. The input and output lines connecting the blocks represent single lines in some cases and multiple lines in others, as the context will indicate. A tuner 12 receives a broadcast video signal from antenna input 14 or an auxiliary video signal, for example from a cable company or a video cassette recorder, on input 16. The output of the tuner 12 on line 13 is an input to IF circuit 18. A first output of the IF circuit 18 on line 15 is an input to the analog interface unit 20. The analog interface unit 20 has an output on line 17 which carries a phase lock loop control signal to tuner 12. Output line 19 from IF circuit 18 provides a video input to video processing circuit 22 and an audio input to digital stereo processing circuit 30. The output of the video processing circuit 22 on line 21 is an input to an adaptive comb filter 24. The output of adaptive comb filter 24 on line 23 is a first input to a kinescope driving circuit 26. The kinescope driving circuit 26 has an output on line 25 which drives picture tube 28. A second input to the kinescope driving circuit 26 is the on screen display OSD drive signal generated by the analog interface unit. A third input to the kinescope driving circuit on line 37 is an auxiliary video signal from pix in pix module 44. Pix in pix denotes the capacity to display an auxiliary video signal, for example, as an inset image in one corner of a larger picture. The output of the digital stereo circuit on line 27 is amplified by power amplifier 32 and coupled to speaker 34.

A microprocessor 36 for controlling operation of the entire television is connected by data bus 29 to each of the analog interface unit 20, the adaptive comb filter 24, the digital stereo circuit 30 and the pix in pix module 44. The data bus 29 may be, for example, a three wire communications and control bus, comprising DATA line 31, CLOCK line 33 and ENABLE line 35. The microprocessor 36 monitors inputs from keyboard 38 on line 39 and inputs from infrared receiver 40 on line 41. Infrared receiver 40 operates responsive to photodiode 42.

A standby/run power supply comprises standby power supply 46, run power supply 48 and voltage regulator 52. The output of standby power supply 46 on line 51 and the output of run power supply 48 on line 49 are combined at junction 50, also denoted as terminal A. Terminal A is an input to voltage regulator 52 on line 53. The standby and run power supplies 46 and 48 are sources of unregulated DC voltage. The output of voltage regulator 52 is a regulated DC voltage, which is tapped for supply to a number of loads. The taps are designated by reference numerals DC1 through DC6. The DC voltage tap DC1 powers microprocessor 36.

The DC voltage tap DC2 powers analog interface unit 20. The DC voltage tap DC3 powers the digital stereo circuit 30. The DC voltage tap DC4 powers the adaptive comb filter 24. The DC voltage tap DC5 powers the pix in pix module 44. The DC voltage tap DC 6, which is shown by dotted line, may be used for any other load, for example the infrared receiver 40 and/or the keyboard 38. Inasmuch as these latter devices are not coupled to the bus 29, and are not subject to the SCR latching problem, they need not be powered by the combined standby/run power supply, at least from the standpoint of reliable operation. However, it is advantageous to have such circuits powered by the run supply during the run mode of operation from the standpoint of efficiency.

A regulated B+ power supply 56 is coupled to an AC power source, for example a mains supply, and provides the primary power for operating the television during the run mode of operation. Regulated B+ power supply 56 may be a switched mode power supply, which comprises a vipur power supply. The regulated B+ voltage on line 45 is a power source for the horizontal deflection circuit 54. The horizontal deflection circuit 54 operates in a flyback mode of operation, and includes a flyback transformer. Line 47 may represent the magnetic coupling of the flyback transformer, such that run power supply 48 is coupled to a secondary winding of the flyback transformer, and develops the run power supply by rectifying flyback pulses with a circuit comprising a diode and a capacitor. Alternatively, for example, the run power supply 48 may be a derived secondary supply coupled to a secondary winding of the transformer of regulated B+ vipur power supply 56.

Each of the control circuits on the serial data bus 29 may be embodied as a CMOS integrated circuit, which is subject to SCR latching under improper operating conditions. The microprocessor 36 operates during both standby and run modes of operation. The analog interface unit 20 operates during both modes, or alternatively, operates in a low power mode during standby. The digital stereo circuit 30, the adaptive comb filter 34 and pix in pix module 44 operate only during the run mode of operation. Thus, the risk of SCR latching is posed, but for the combined standby/run power supply according to this invention. The microprocessor 36 is responsible for switching the other control circuits on or off, or between low power and high power modes of operation. The microprocessor 36 is also responsible for turning the regulated B+ power supply and the horizontal deflection circuit on during run mode and off during standby mode. The timing sequence for such control is explained more fully in connection with FIGS. 3(a)-3(e).

With reference to FIG. 2, a standby power supply 46 comprises a transformer T1 having a primary winding W1 coupled to an AC power source, for example a mains supply, and a secondary winding W2 coupled to a full wave bridge rectifier. The full wave bridge rectifier comprises diodes D1, D2, D3 and D4. The output of the full wave bridge rectifier at terminal A is coupled to a large storage and filter capacitor C2. A run power supply 48 is coupled to the secondary winding W4 of a flyback transformer T2. The primary winding W3 of the flyback transformer is coupled to B+ voltage and a switching circuit 64. The horizontal deflection circuit 54 is turned on and off by circuit 60, responsive to control signals received from microprocessor 36. The run power supply 48 comprises diode D5 and capacitor C1. When the switching transistor in switching circuit 64 is turned off, flyback pulses in winding W4 are gated through diode D5. The energy is stored in storage and filter capacitor C1, developing a source of DC voltage at terminal B. Diode D6 isolates terminal A from terminal B during standby operation.

Standby supply 46 may be so configured as to generate DC voltage of approximately +6 volts during standby operation. Run power supply 48 may be configured to provide DC voltage at approximately +8 volts during run mode. Diode D6 is reverse biased during standby mode so that no current will flow from terminal A to terminal B. Conversely, during run mode, diode D6 will be forward biased and diodes D3 and D4 will be reverse biased. This mechanism enables the standby voltage source to operate during standby mode without loading from the run power supply circuitry. This also enables the run power supply to supplant the standby power supply during the run mode of operation as the transformer T1 is isolated from terminal A. Accordingly, the voltage sources are not summed, nor even operatively combined. The sources energize the voltage regulator substantially independently of one another, during the respective modes of operation.

A voltage regulator 52 comprises a transistor Q1, a resistor R1 and a Zener diode D7. Voltage regulator 52 is configured as a series pass regulator. The output of the voltage regulator 52 at the emitter electrode of transistor Q1 is a regulated DC voltage at a level of +5 volts. This level, which is set by the Zener diode D7, will be the same irrespective of whether the collector electrode of transistor Q1 is receiving current from the standby supply 46 or the run supply 48.

Even if both power sources are inoperable, for example during a power interruption, the regulator will continue to receive current for a certain period of time as capacitor C1 discharges and thereafter, as capacitor C2 discharges, after diode D6 becomes reverse biased. This provides a regulated voltage supply for the microprocessor to undertake a controlled and orderly shutdown of the television receiver responsive to AC power interruption.

The 5 volt run/standby voltage supply at the collector of transistor Q1 is coupled to a standby and run mode load, for example microprocessor 36, and to a run mode only load, for example adaptive comb filter 24. The regulated voltage supply is also shown as being coupled to keyboard 38 and remote control receiver 40, the latter being responsive to operation of a remote control unit 62. The microprocessor 36 operates during standby mode, and is capable of displaying certain status conditions, for example by light emitting diode LED1. The light emitting diode is controlled by a circuit including resistors R2 and R3 and transistor Qs. Microprocessor 36 can switch the adaptive comb filter on or off, or between low and high power modes of operation, by signals transmitted over data bus 29.

Each integrated circuit interconnected by the data bus, and in particular CMOS integrated circuits, will receive the same regulated DC voltage level during standby mode, during run mode and during AC power interruption. The risk of SCR latching due to differences in input voltages is virtually eliminated. Moreover, the need for loading a standby power supply during run mode of operation is also virtually eliminated. The combined standby/run power supply affords maximum efficiency and maximum reliability.

The voltage levels at terminal A are related to the circuit illustrated in FIG. 2. The component values illustrated in FIG. 2, as well as those illustrated in FIGS. 4 and 5, are for an AC mains supply of 60 Hz, at a nominal voltage level of 120 volts. Different circuit component values would be appropriate for an AC mains supply operating at 50 Hz and a nominal level of 220 volts.

Figure 3:
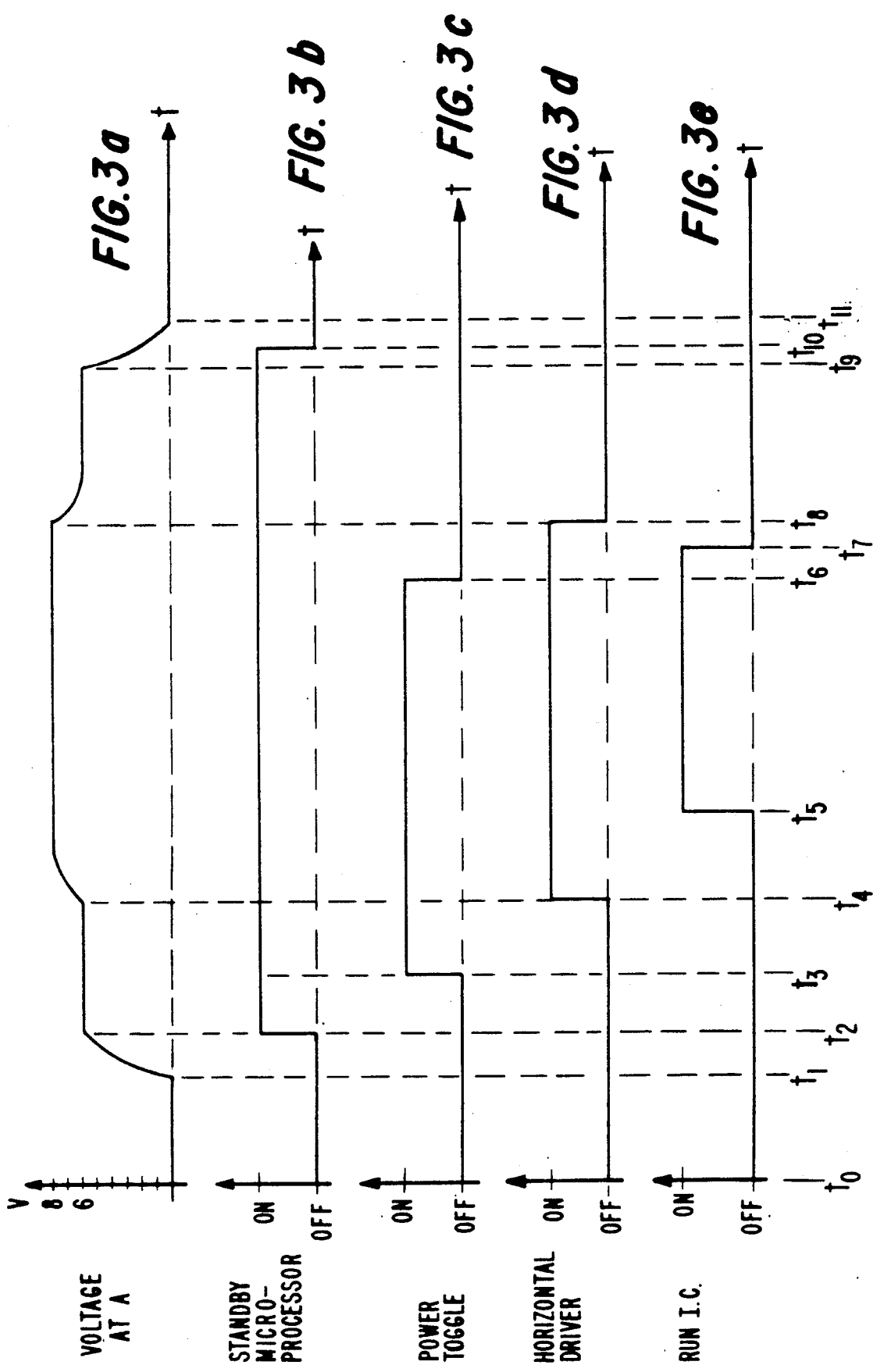

The timing sequence for operating the standby/run power supply and control circuit is illustrated in FIGS. 3(a) through 3(e). At time t0 the television apparatus is unplugged and completely inoperable. At time t1, the television apparatus is plugged in, as shown in FIG. 3(a). Current is supplied for charging capacitor C2, and at time t2, the unregulated voltage has reached a level of +6 volts. At approximately the same time t2, the regulated 5 volt voltage is available to microprocessor 36, which turns on, as shown in FIG. 3(b). A power switch for the apparatus is toggled on at time t3, as shown in FIG. 3(c). This is sensed by the microprocessor 36, which turns on the regulated B+ power supply 56, and thereafter, the horizontal deflection circuit 54, as shown in FIG. 3(d). This results in run voltage at terminal B, which forward biases diode D6, and supplants the standby voltage supply at terminal A. When the microprocessor senses that the run voltage has been established, for example at time t5, the run control circuits are turned on, as shown in FIG. 3(e). The television apparatus is therefore fully operational until the power switch is toggled off at time t6. This is sensed by the microprocessor, which turns off the run control circuits at time t7 and then turns off the horizontal deflection circuit at time t8. Capacitor C1 begins discharging at time t8, so that diode D6 becomes reverse biased again and the standby voltage source provides 6 volts of unregulated DC voltage at terminal A. At time t9, the apparatus is unplugged or AC power is otherwise interrupted. As capacitor C2 begins to discharge, the microprocessor has sufficient power to effect a controlled shutdown. At time t10, capacitor C2 has discharged to the point that the microprocessor can no longer operate, and it becomes inactive. Capacitor C2 is fully discharged at t11, and the television apparatus will remain completely inoperable until AC power is restored.

The circuit illustrated in FIG. 4 is similar in many respects to the circuit shown in FIG. 2. However, the former further illustrates a discrete switching circuit for controlling run mode only control circuits by detecting the run supply voltage and illustrates generally the kind of switch mode power supply 56 utilizing a transformer T4 in a vipur power supply to generate the run voltage source 48. During standby operation, a source 46 of DC voltage is developed across capacitor C12 by the full wave bridge rectifier, at a nominal level of +8 volts. Diode D6 is reversed biased, so that current into the collector of transistor Q1, forming part of voltage regulator 52, originates only with the standby source 46. A regulated DC voltage of +5 volts is available across capacitor C4, at terminal C. During standby mode, the collector of transistor Q3, which is a low current driver, is at approximately 5.6 volts due to Zener diode D7. The resistive voltage divider formed by resistors R6 and R7 is chosen so that the base of transistor Q3 is at or slightly below approximately +5 volts during standby operation, so that transistor Q3 will be turned on. The voltage provided at the collector of transistor Q3 during standby is sufficient to turn on transistor Q4, which pulls the collector of transistor Q4 to ground. This is equivalent to a logical LO signal. This also pulls the base of transistor Q2 to ground, which keeps transistor Q2 turned off. When run mode is established by the microprocessor, not shown in FIG. 4, the run voltage source 48 will develop a DC voltage supply at a nominal level of +10 volts, which is sufficient to forward bias diode D6. Resistors R6 and R7 are also chosen so that when the voltage at terminal A rises to approximately 10 volts, the voltage at the base of transistor Q3 will increase sufficiently to reverse bias the emitter base junction thereof, and turn off transistor Q3. When transistor Q3 is turned off, transistor Q4 will turn off. When transistor Q4 turns off, its collector will go HI, which generates a reset pulse for all of the integrated circuits, except the microprocessor. This also raises the voltage at the base of transistor Q2, which turns on and provides regulated DC voltage for the run mode only control circuits. Diodes D3 and D4 are reverse biased, and the voltage regulator is energized substantially only by the run supply 48. The voltage at terminal C is essentially equal to the voltage at the emitter of transistor Q2, avoiding the risk of SCR latching.

An alternative control circuit of discrete components is shown in FIG. 5, which also provides for two levels of standby voltage. The discrete control circuit will turn off the run mode only control circuits responsive to AC power interruption, in order to divert as much power as possible to the microprocessor to effect a controlled shutdown. The standby power supply 46 generates a DC voltage at terminal A at a level of approximately +20 volts. The run power supply 48, when operable, develops a DC voltage at a level of approximately +22 volts. Diode D6 is reverse biased during standby operation. Transistor Q6 operates as a series pass regulator, and +18 volts standby voltage is available at the emitter electrode of transistor Q6. This level is set by Zener diode D9. Transistor Q1 has the 18 volts standby voltage at its collector, and operates as a second series pass regulator, providing +5 volts standby voltage at its emitter electrode. This level is set by Zener diode D7.

A voltage level of 5.6 volts, determined by Zener diode D7, is supplied to the emitter electrode of transistor Q4. Resistors R16 and R17 are chosen to keep the base of transistor Q4 at a high enough level to reverse bias the emitter base junction thereof, and maintain transistor Q4 turned off. When transistor Q4 is turned off, transistor Q5 is turned off. When transistor Q5 is turned off, transistor Q2 will be turned on, and transistor Q2 will supply regulated DC voltage to switched control circuits during the run mode of operation.

It will be appreciated that the run voltage source does not form a control input to the discrete control circuit of FIG. 5, as is the case in the circuit illustrated in FIG. 4. If the television apparatus is unplugged or otherwise experiences AC power loss, the voltage at the base of transistor Q4 will fall and transistor Q4 will be turned on. When transistor Q4 is turned on, transistor Q5 will be turned on. When transistor Q5 is turned on, the base of transistor Q2 will be pulled down, and transistor Q2 will be turned off. When transistor Q2 is turned off, the switched run mode only control circuits are turned off. The standby load generally is a high impedance load. Accordingly, as capacitors C21 and C22 discharge, providing power during AC power interruption, most of the power will be directed to the 5 volt standby supply at the emitter of transistor Q1, which operates the microprocessor. This maximizes the time available to the microprocessor to effect a controlled shutdown. The presence or absence of the standby and switched run voltages can be sensed by the microprocessor, not shown in FIG. 5, and utilized to control operation of the horizontal deflection circuit 54, for example, to turn the run supply on and off.

FIG. 6 illustrates an integrated circuit IC1 connected to an integrated circuit IC2 under the condition of IC2 being turned off by a transistor $Q_2$ because switch S1 is connected to ground. Normally, if R20 is a small value, sufficient voltage and current are available into the input of IC2 along the current flow path marked by arrow A to cause an SCR latch. By using an NPN transistor for $Q_2$, which may correspond to transistor $Q_2$ in FIG. 4, the current flow path marked by arrow B is an open circuit. An SCR latch cannot occur without a return path for the potential current flow.

A standby/run power supply and control circuit according to this invention provides reliable operation, particularly with interconnected CMOS integrated circuits, and enables economical construction of television apparatus. The standby/run power supply also maximizes remaining power available during periods of AC power interruption, to enable a microprocessor to effect a controlled shutdown of a television apparatus.

What is claimed is:

1. A combined standby/run power supply and control circuit for a television apparatus, comprising:
    means for generating a standby source of DC voltage when said apparatus is coupled to an AC power source;
    means for generating a run source of DC voltage;
    two interconnected CMOS integrated circuits coupled to a common reference potential and having respective supply voltage inputs, one of said integrated circuits being active in both standby and run modes of operation and the other of said integrated circuits being active only in said run mode; and,
    regulating means, having an input coupled to both said standby and run sources of DC voltage and having an output coupled to said respective supply voltage inputs, for generating a regulated supply voltage from said standby source during said standby mode and from said run source during said run mode, for energizing said interconnected CMOS integrated circuits at substantially the same supply voltage level during said run mode.

2. The power supply and control circuit of claim 1, further comprising a communications and control bus interconnecting said CMOS integrated circuits.

3. The power supply and control circuit of claim 1, wherein said at least one CMOS integrated circuit active during both said standby and run modes comprises control means for activating and deactivating both said means for generating said run source and said at least one CMOS integrated circuit active only during said run mode.

4. A combined standby/run power supply and control circuit for a television apparatus, comprising:
    means for generating a standby source of DC voltage when said apparatus is coupled to an AC power source;
    means for generating a run source of DC voltage;
    a plurality of interconnected CMOS integrated circuits, at least one of which is active in both standby and run modes of operation and at least one of which is active only in said run mode; and, regulating means having a series pass regulating circuit coupled to both said standby and run sources of DC voltage for generating a regulated supply voltage from either of said standby and run sources of unregulated voltage for energizing said interconnected CMOS integrated circuits at substantially the same supply voltage level.

5. A combined standby/run power supply and control circuit for a television apparatus, comprising:
  means for generating a standby source of DC voltage when said apparatus is coupled to an AC power source;
  means for generating a run source of DC voltage;
  a plurality of interconnected CMOS integrated circuits, at least one of which is active in both standby and run modes of operation and at least one of which is active only in said run mode;
  means for isolating said run source from said standby source in said standby mode;
  means for isolating said standby source from said run source in said run mode; and,
  regulating means coupled to both said standby and run sources of DC voltage for generating a regulated supply voltage from either of said standby and run sources of unregulated voltage for energizing said interconnected CMOS integrated circuits at substantially the same supply voltage level.

6. The power supply and control circuit of claim 1, wherein said interconnected CMOS integrated circuits are subject to SCR latching when energized by different respective supply voltage levels.

7. A standby/run power supply and control circuit for a television apparatus, comprising:
  means for developing a standby source of DC voltage when said apparatus is coupled to an AC power source, said means including a first energy storage device;
  switched means for developing a run souce of DC voltage, said switched means including a second energy storage device;
  at least one switched control circuit;
  at least one unswitched control circuit interconnected with said one switched control circuit, operable during both standby and run modes of operation and adapted for activating and deactivating both said means for developing said run source and said one switched control circuit during said run and standby modes respectively; and,
  regulating means coupled to both said standby and run sources for generating a regulated output supply voltage from either of said standby and run sources for energizing said one unswitched control circuit, and said swiched control circuit as necessary, at substantially the same supply voltage level during said standby and run modes and during AC power interruption, for a length of time while said first and second energy storage devices discharge into said regulating means, sufficient for said one unswitched control circuit to turn off said one switched control circuit and said run source.

8. The power supply and control circuit of claim 7, wherein said means for developing said standby source of unregulated DC voltage comprises:
  a transformer coupled to an AC power input of said apparatus;
  a bridge rectifier coupled to said transformer; and,
  a capacitor coupled to said bridge rectifier.

9. The power supply and control circuit of claim 7, wherein said switched means for developing said run source of DC voltage comprises a secondary side supply derived from operation of a switched mode power supply circuit.

10. The power supply and control circuit of claim 9, wherein said switched mode power supply circuit comprises a vipur power supply.

11. The power supply and control circuit of claim 9, wherein said switched mode power supply comprises a flyback transformer.

12. The power supply and control circuit of claim 7, wherein said regulating means comprises a series pass regulating circuit.

13. The power supply and control circuit of claim 7, further comprising means for isolating said run source from said standby source in said standby mode.

14. The power supply and control circuit of claim 8, wherein said run source operates at a voltage level of sufficient magnitude to reverse bias diodes in said bridge rectifier and isolate said transformer from said voltage regulating means in said run mode.

15. A standby/run power supply and control circuit for a television apparatus, comprising:
  an unswitched source of DC voltage available during a standby mode of operation and a switched source of DC voltage available only during a run mode of operation;
  a voltage regulator having an input coupled to both said DC voltage sources and having an output for supplying a regulated DC voltage at a first power level during said standby mode and at a second power level during said run mode;
  switched and unswitched CMOS control circuits coupled to said regulated voltage output and to a common reference potential;
  a control bus interconnecting said control circuits; and,
  means for isolating said unswitched source from said voltage regulator in said run mode, said unswitched control circuit being energized by said unswitched source in said standby mode and both said unswitched and switched control circuits being energized by said switched source in said run mode.

16. The power supply and control circuit of claim 15, wherein said unswitched source of DC voltage comprises:
  an AC supply;
  a diode bridge; and,
  a transformer having a primary winding coupled to said AC mains supply and having a secondary winding coupled to said diode bridge.

17. The power supply and control circuit of claim 15, wherein said switched source of DC voltage exceeds said standby source in magnitude.

18. The power supply and control circuit of claim 15, wherein said unswitched and switched CMOS control circuits are CMOS integrated circuits.

19. The power supply and control circuit of claim 15, further comprising means for isolating said switched source from said unswitched source in said standby mode.

20. The power supply and control circuit of claim 15, wherein said isolating means comprises diodes in a full wave bridge rectifier coupled between said voltage regulator and an AC power supply.

21. The power supply and control circuit of claim 17, wherein said isolating means comprises diodes in a full wave bridge rectifier coupled between said voltage regulator and an AC power supply.

22. A standby/run power supply for a control circuit in a television apparatus, comprising:
an unswitched source of DC voltage available during a standby mode of operation and a switched source of DC voltage available only during a run mode of operation;
a voltage regulator having one input coupled to both said DC voltage sources and having one output for supplying a regulated DC voltage for driving interconnected digital control circuits, switched and unswitched, at a common voltage level in said run mode;
means for isolating said switched source from said voltage regulator in said standby mode; and,
means for isolating said unswitched source from said voltage regulator in said run mode.

23. The power supply of claim 22, wherein said switched source of DC voltage comprises a horizontal deflection circuit, having a flyback transformer and secondary side rectifying means coupled to said transformer.

24. The power supply of claim 22, wherein said switched source of unregulated DC voltage comprises a switch mode power supply, having a vipur switching circuit coupled to a transformer and secondary side rectifying means coupled to said transformer.

25. The power supply of claim 22, wherein said switched source of DC voltage exceeds in magnitude said unswitched source.

26. The power supply of claim 22, further comprising means for isolating said switched and unswitched sources of DC voltage from one another.

27. The power supply of claim 22, wherein said digital control circuits comprise CMOS integrated circuits.

28. The power supply of claim 22, wherein said voltage regulator supplies substantially the same supply voltage level to each of said interconnected circuits, whenever each of said circuits is active, in both said standby and run modes.

29. The power supply of claim 1, comprising a plurality of said interconnected CMOS integrated circuits.

* * * * *